(12) United States Patent
Moyer

(10) Patent No.: US 9,901,072 B2
(45) Date of Patent: Feb. 27, 2018

(54) AUTOMATED ANIMAL FEEDER

(71) Applicant: James Moyer, Palmyra, VA (US)

(72) Inventor: James Moyer, Palmyra, VA (US)

(73) Assignee: James E. Moyer, Fishersville, VA (US)

( * ) Notice: Subject to any disclaimer, the term of this patent is extended or adjusted under 35 U.S.C. 154(b) by 281 days.

(21) Appl. No.: 14/811,787

(22) Filed: Jul. 28, 2015

(65) Prior Publication Data
US 2016/0021848 A1    Jan. 28, 2016

Related U.S. Application Data

(60) Provisional application No. 62/029,847, filed on Jul. 28, 2014.

(51) Int. Cl.
*A01K 5/02*          (2006.01)
*A01K 29/00*       (2006.01)

(52) U.S. Cl.
CPC .......... *A01K 5/0258* (2013.01); *A01K 5/0291* (2013.01); *A01K 29/00* (2013.01)

(58) Field of Classification Search
CPC .................................................. A01K 5/0258
USPC ..... 119/51.01, 57.91, 57.92, 51.11, 57, 57.1, 119/57.7
See application file for complete search history.

(56) References Cited

U.S. PATENT DOCUMENTS

| | | | | |
|---|---|---|---|---|
| 1,274,548 A | * | 8/1918 | Holnagel et al. ...... | B65G 37/00 119/57.1 |
| 2,755,771 A | * | 7/1956 | Martin ................. | A01K 5/0225 119/53 |
| 3,716,172 A | * | 2/1973 | Crippen ............... | A01K 5/0291 119/51.11 |
| 3,920,224 A | | 11/1975 | Fassauer | |
| 4,020,980 A | * | 5/1977 | Illes, Jr. ............ | B65G 65/4836 222/411 |

(Continued)

*Primary Examiner* — David J Parsley
*Assistant Examiner* — Danielle A Clerkley
(74) *Attorney, Agent, or Firm* — Janice Pringle

(57) ABSTRACT

An automated animal feeder is disclosed having a storage area with a top at one end and the second feeding into a dispensing module containing a dispensing tube. An auger, connected to a support and motor, extends into the second opening of the storage area. Preferably the auger support is movable along the dispensing module to vary a distance between the length of the auger at the proximal opening of the dispensing tube. A programmable control panel controls the motor and can have a display screen, speaker and programming members, or the control panel can be controlled by remote control. Power can be from at least one from the group of replaceable battery, rechargeable battery, solar or electricity, power the control panel and motor. A deflection tab extends into the dispensing tube, spaced from the auger, to prevent the accumulation food on the auger. The hanging member on the top can affixed to a stand with a post having a first end, a second end and a pivot point, the pivot point being affixed to the stand. The first end has a connection member for the hanging member and said second end has a rotation prevention member and an anchor. The post can rotate upon the release of the anchor to a predetermined distance from the ground as determined by the rotation prevention member or be locked in an upright position by said anchor.

16 Claims, 7 Drawing Sheets

(56) References Cited

U.S. PATENT DOCUMENTS

| | | | |
|---|---|---|---|
| 4,640,229 A * | 2/1987 | Swartzendruber | A01K 5/0225 119/51.11 |
| 4,676,197 A * | 6/1987 | Hoover | A01K 5/02 119/54 |
| 5,335,619 A * | 8/1994 | Pollock | B65G 19/16 119/57.4 |
| 5,435,267 A * | 7/1995 | Patterson | A01K 5/0241 119/52.4 |
| 5,513,597 A * | 5/1996 | Pollock | A01K 5/0258 119/57.4 |
| 5,549,075 A * | 8/1996 | Golden | A01K 39/0125 119/57.8 |
| 5,850,797 A | 12/1998 | Hunicke | |
| 6,135,056 A | 10/2000 | Kuo | |
| 6,305,320 B1 | 10/2001 | Fore | |
| 6,401,657 B1 | 6/2002 | Krishnamurthy | |
| 6,622,653 B1 | 9/2003 | Starnes, Jr. | |
| 6,988,465 B2 * | 1/2006 | Park | A01K 5/0291 119/51.12 |
| 7,028,635 B1 | 4/2006 | Eastman | |
| 7,523,717 B2 | 4/2009 | Nicholes | |
| 7,650,855 B2 | 1/2010 | Krishnamurthy | |
| 7,798,098 B1 | 9/2010 | Patterson | |
| 8,074,602 B2 * | 12/2011 | Laliberte | A01K 5/0275 119/57.92 |
| 8,695,534 B2 | 4/2014 | Banuelos | |
| 8,701,595 B2 | 4/2014 | Jin | |
| 9,301,495 B1 * | 4/2016 | Bogart | A01K 5/01 |
| 2003/0019437 A1 * | 1/2003 | Fore | A01K 5/02 119/57.92 |
| 2008/0202435 A1 * | 8/2008 | Nowacek | A01K 5/004 119/51.01 |

* cited by examiner

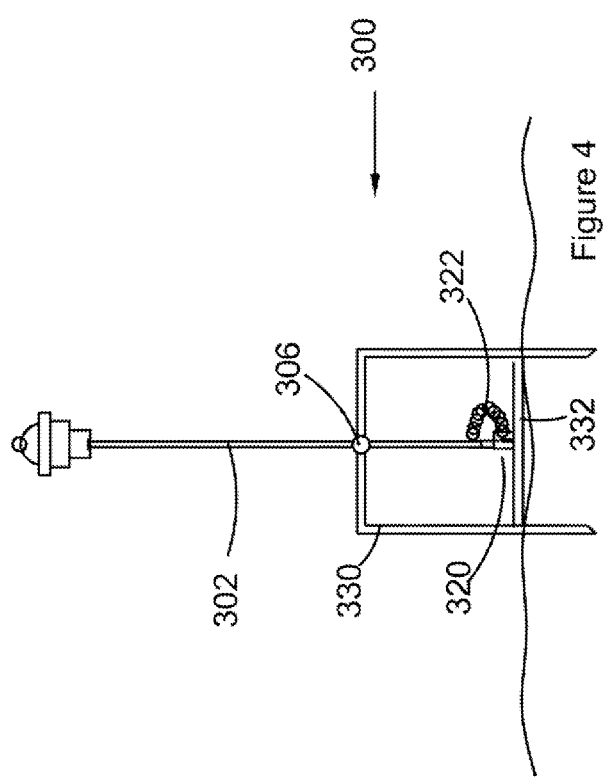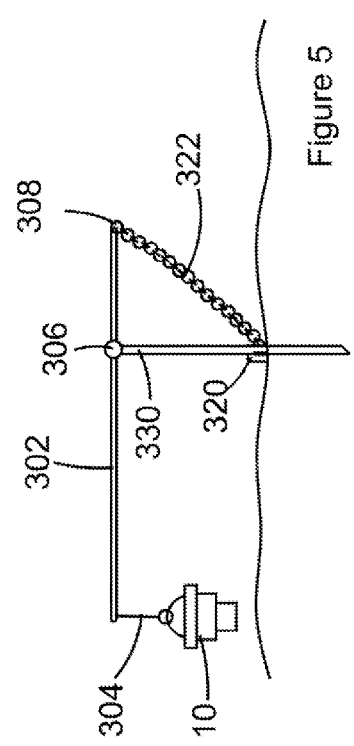

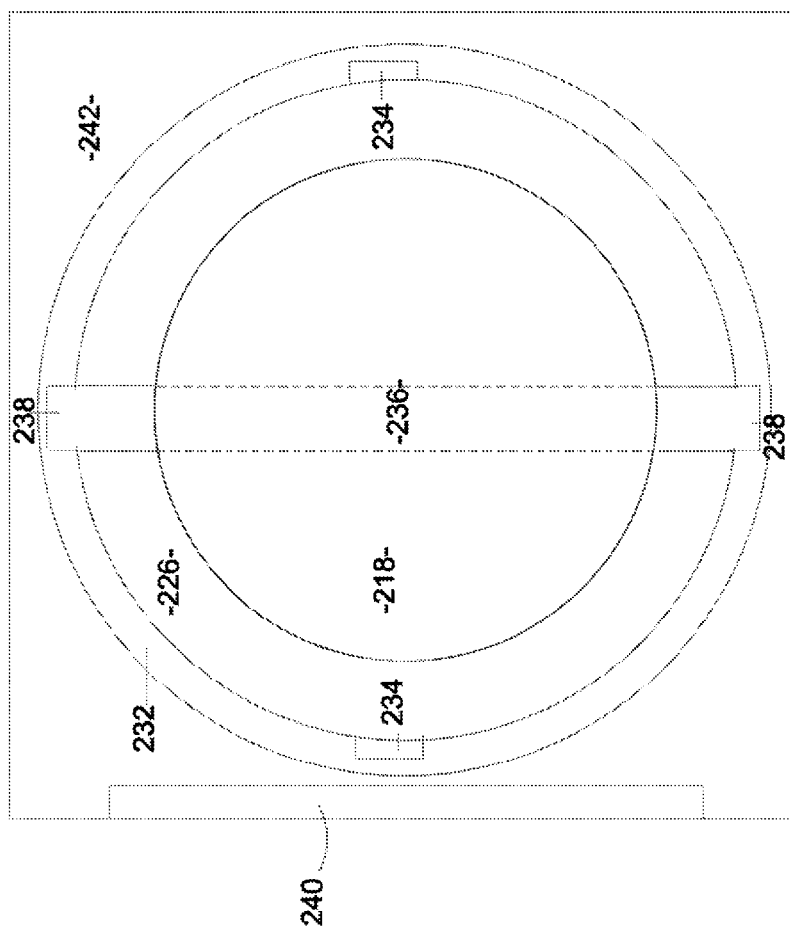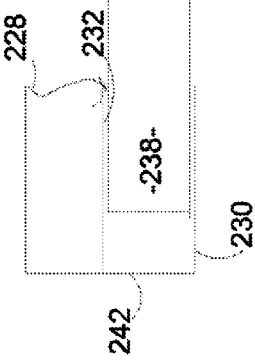

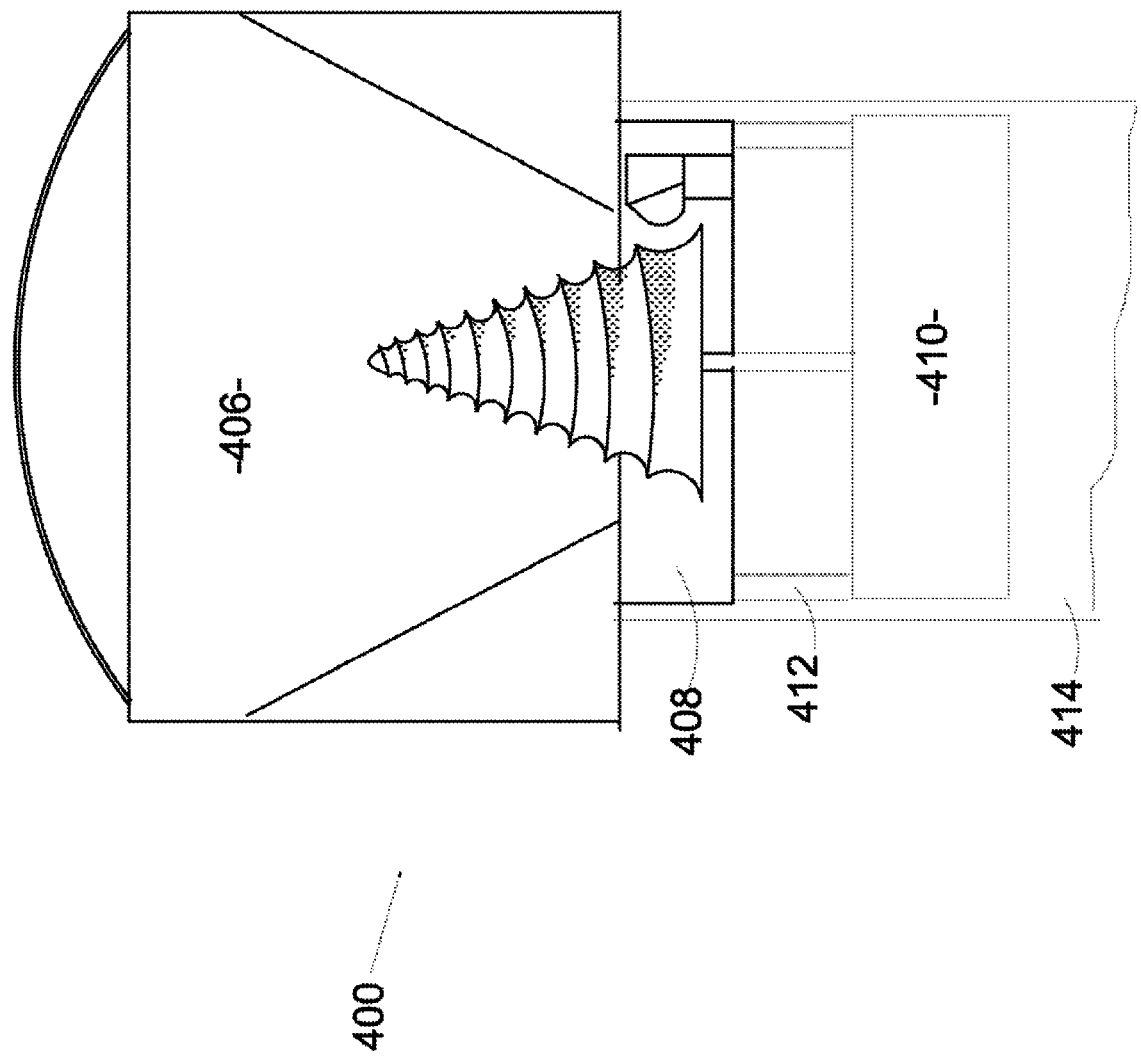

AUTOMATED ANIMAL FEEDER

FIELD OF THE INVENTION

The invention discloses an automatic food dispenser for outdoor placement that is inaccessible to wildlife.

BACKGROUND OF THE INVENTION

Animal feeders, including wildlife feeders, are known in the prior art to dispense feed to domestic animals, such as outdoor cats and dogs when the owner is unable to be present, as well as wildlife. There are two types of feeders, a passive feeder that does not use a motor and an active feeder that uses a motor to cast feed from a hopper onto the ground. Active feeders usually include a control unit having a timer and are battery or electric powered, permitting the user to set a timer to dispense the feed at regular intervals. The animals, domestic and wild, learn these intervals and will tend to aggregate at the feeder at those times. The problem is that prior art feeders, both passive and active, are susceptible to being raided by squirrels, chipmunks, etc. prior to dispensing the food.

In a passive feeder, the feed is fed from a hopper into a feed trough and the feed lays adjacent a trough opening with the animal eating from the mouth of the food trough. As the food is eaten, gravity will allow more to enter the feed trough. Such a feed mechanism is entirely passive, depending as it does on the impetus of gravity to allow the granular feed to continue to move into the feed trough as the animal eats from the end of the trough. This provides food at all times which, if the intent is to feed a domestic animal at specific times, will attract wildlife and the food will be rapidly consumed

SUMMARY OF THE INVENTION

An automated animal feeder is disclosed having a storage are with at least one side, a proximal end with a first opening and a distal end with a second opening. Preferably the storage area has sloped sides to direct food into the dispensing tube. A dispensing module ha at least one side, and a dispensing tube within the module that has a proximal opening adjacent to the second opening of the storage area and a distal opening. An auger, having a first periphery and a second periphery and a length there between, extends into the second opening of the storage area. The auger is connected to an auger support that extends from opposing points of either the dispensing tube or the dispensing module. Preferably the auger support is movable along the dispensing module to vary a distance between the length of the auger at the proximal opening of the dispensing tube. This can be done by having multiple pairs of flanges, each pair opposing one another and dimensioned to receive the auger support. Each pair being distanced from other pair to vary a distance between the length of the auger and the proximal opening of the dispensing tube. A motor, supported by the auger support, is affixed to the auger, and controlled by a control panel containing a microprocessor. The programmable control panel can have a display screen, speaker and programming members. Sensors placed within the storage area can be connected to the control panel to alert when food is low within the storage area. Alternatively the control panel can be programmed by remote control. Power means, at least one from the group of replaceable battery, rechargeable battery, solar or electricity, power the control panel and motor. Solar panels, can be used to recharge the batteries. A top is removably affixed to the proximal end of the storage area and preferably has a hanging member and dome shaped to prevent animal purchase.

A deflection tab extends into the dispensing tube, spaced from the auger, to prevent the accumulation food on the auger. The deflection tab can be affixed to a wall of the dispensing module or free standing.

The hanging member on the top can affixed to a stand with a post having a first end, a second end and a pivot point, the pivot point being affixed to the stand. The first end has a connection member for the hanging member and said second end has a rotation prevention member and an anchor. The post can rotate upon the release of the anchor to a predetermined distance from the ground as determined by the rotation prevention member or be locked in an upright position by said anchor.

BRIEF DESCRIPTION OF THE DRAWINGS

These and other objects, features, advantages and aspects of the present invention can be better understood with reference to the following detailed description of the preferred embodiments when read in conjunction with the appended drawing figures.

FIG. 4 is a plan view of the holder and feeder in the vertical position in accordance with the disclosed invention;

FIG. 5 is a plan view of the holder and feeder in the horizontal position in accordance with the disclosed invention;

FIG. 7 is a top view of the interior of the feeder illustrating a mechanism for changing the height of the auger in accordance with the disclosed invention;

FIG. 8 is a side view of the mechanism of FIG. 7 in accordance with the disclosed invention; and FIG. 9 is a front view of an additional embodiment of the feeder in accordance with the disclosed invention.

DETAILED DESCRIPTION OF THE INVENTION

Figure 1:
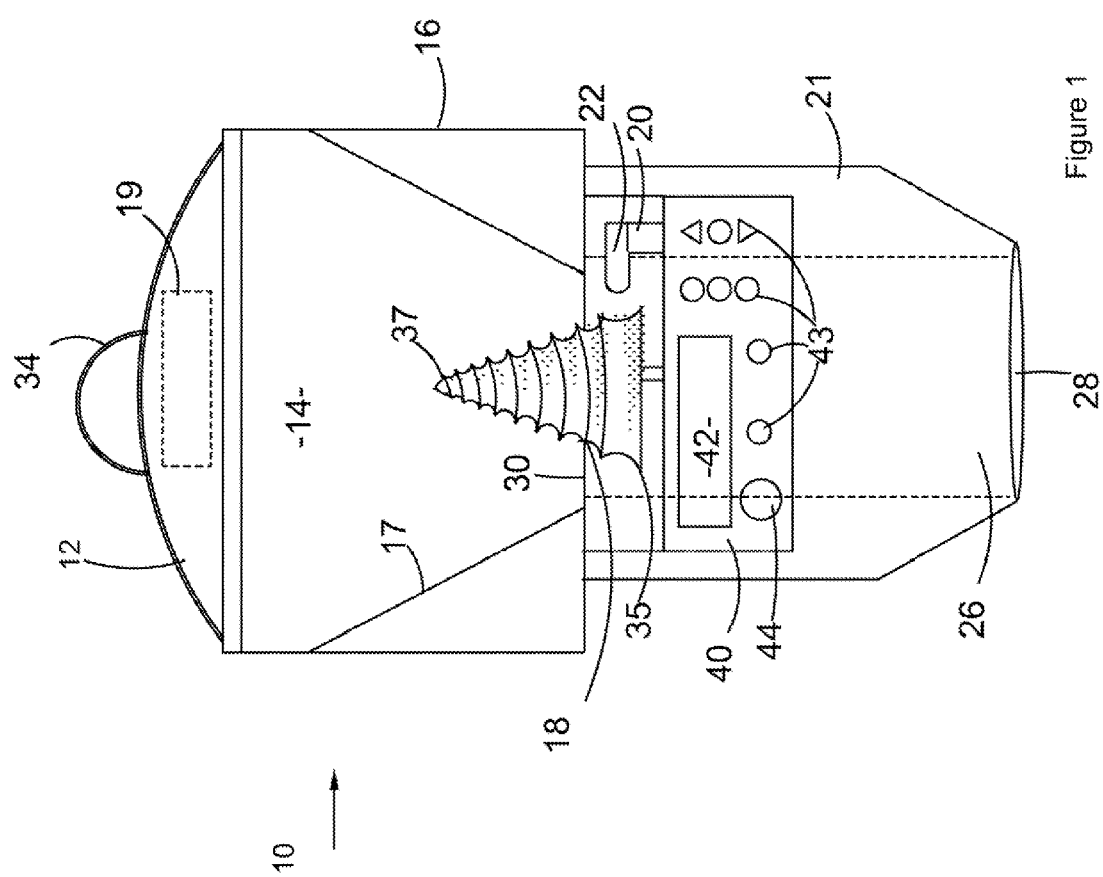
FIG. 1 is a front view of the feeder in accordance with the disclosed invention.

Glossary
10 feeder
12 feeder top
14 feed storage area
17 sloped sides
16 upper body
18 auger
20 riser
21 dispensing module
22 deflection tab
26 dispensing tube
28 dispenser opening
30 opening
32 motor
35 auger distal end
36 support
37 auger proximal end
38 dispensing tube wall
40 control panel 42 display
44 speaker
100 feeder
118 auger
122 deflector
126 dispensing tube
128 dispensing area
130 feed regulator
140 optic sensors
148 plug receptacle
160 horizontal support
218 auger
228 cover
230 lower rim
232 top rim
234 notches
236 support
238 flanges
240 electronics
242 walls
300 stand
302 vertical post
304 hanging mechanism
306 rotation member
308 latching member
320 ground anchor latch
322 chain
330 ground anchor
332 crossbar
400 feeder
406 Storage area
408 auger house
410 electronics and motor housing
412 posts
414 sleeve The disclosed feeder enables users to automatically dispense feed at predetermined times while preventing animal access to the feeder itself. Although this would generally be used to feed domestic animals, it can also be used to attract wildlife on a timed basis. FIG. 1 illustrates the disclosed automated animal feeder 10 constructed using a transparent material to enable the food to be monitored and the auger 18 viewed. The feeder 10 can also be constructed from a solid material, with or without windows and, if desired, sensors used to monitor food levels. The removable top 12 of the feeder 10 is smooth and doomed shaped to repel rain and to prevent small animals from gaining purchase. In this embodiment a connection loop 34 is affixed to the top to provide a connection point for a chain or other hanging device as well as a way to easily grip the top 12 for on/off rotation. Alternatively, a connection point can be recessed into the top as known in the art. Other animal-proof methods, rather than rotation, can be used to secure the top 12 to the upper body 16.

The upper body 16 of the feeder 10 contains the feed storage area 14 that feeds into the dispensing tube 26 housed within dispensing module 21 and subsequently to the dispenser opening 28. Within the storage area 14, sloped wall 17 funnels the feed toward the dispensing tube 26. The dispensing tube 26 extends downward from the center of the bottom of the feed storage area 14 and must have a width sufficient to enable the food to drop easily. The width would generally be 3 inches however this can be increased or reduced depending on the feed being dispensed. Although the configuration illustrated herein is round, it should be noted that the feeder 10 can be any shape that meets the criteria set forth herein. The dispensing module 21 is generally larger than the dispensing tube 26 to accommodate the control panel 40 and provide structural support for the elements within the feeder 10 as described herein.

To prevent the food within the storage area 14 from being blocked or freely filtering into the dispensing tube 26, an inverse auger 18 is attached perpendicularly to the upper body 16. Auger 18, having a distal end 35 and proximal end 37, extends into the storage area 14 and is centered within the food opening 30. The sloped wall 17 allows gravity to force food towards the opening 30, which is partially blocked by the auger 18. When the auger 18 turns, the food is engaged by the threads or grooves in the auger 18 and pulled through the opening 30 into the guiding chute or dispensing tube 26. Thus, the food remains in the storage area until the auger 18 is rotated. A motor 32 (FIG. 2) is attached to the auger 18 for rotation, thereby preventing the food opening 30 from being blocked and permitting timed and controlled dispensing. In this embodiment the dispensing tube 26 has the same width as the opening 30, however the dispensing tube 26 can be wider or narrower, depending upon end use. The critical feature is that the food must have sufficient space around the auger 18 to easily descend upon activation; however, the distance between the auger 18 and the food opening 30 must not be sufficient to enable food to fall through without activation of the auger 18. Preferably, the auger 18 can be moved to bring the proximal end 35 further into the dispensing tube 26, thereby increasing the size of feed that can pass from the storage area 14 to the dispensing tube 26.

During rainy or humid conditions, some food may stick to the auger, which if uncorrected, will prevent food from dropping into the guiding chute and permit molding. To further maintain the flow of the food and prevent sticking, a deflection tab 22 is positioned to remove food from the grooves of the auger 18. In the embodiment of FIG. 1, the deflection tab 22 is supported by the riser 20. The distance between the auger 18 and deflection tab 22 can preferably vary, depending on the size of the food being dispensed. The distance should be sufficient for the unit to dispense bird seed where the auger 18 is positioned at its highest point and to dispense dog food where positioned at the lowest point. In other words, when the auger 18 distal end 35 is opposite the deflection tab 22, the separation would be in the range of about ⅛ of an inch, accommodating passage of feed such as bird seed. When the auger 18 has been moved down, placing the auger 18 proximal end 37 opposite the deflection tab 22, the separation would be about ¾ inch accommodating the passage of dog food from the storage are 14 to the dispensing tube 26. Although bird seed and dog food are used as examples, any type of food or material can be dispensed and the auger 18 moved to any number of positions. The motor used for the rotation can be powered by battery 19, rechargeable by solar or electricity, replaceable batteries, electric, wind or any other method or combination thereof. A combination of powering methods provides the user with the ability to place the feeder at a convenient location without power concerns.

In order for the feeder to be automated, the control panel 40 and display 42 are incorporated into the feeder 10. The use of a microprocessor (not shown) within the control panel 40 enables the auger 18 to be rotated, and therefore food dispensed, at predetermined time intervals as set by the user. The display panel 42 can display current time, programmed feeding times, remaining food, etc, and can also be used to manually program feeding amounts and intervals as well as for data input. A remote control can also be used to test functioning, initiate one-time feedings, cancel scheduled feedings, and program and/or override time intervals. A number of programming members 43 can be used to control the features enabled by the program within the microprocessor, for example rotation time, brightness, audio volume, rotation frequency, etc.

Preferably the feeder 10 includes audio alarm capabilities within the microprocessor and a speaker 44. The alarm can be used to indicate low battery, need to refill the food, loss of electrical connection in electric units with a battery backup, an obstruction, or other indicator enabled by the feeder 10 microprocessor and sent to the speaker 44.

Figure 2:
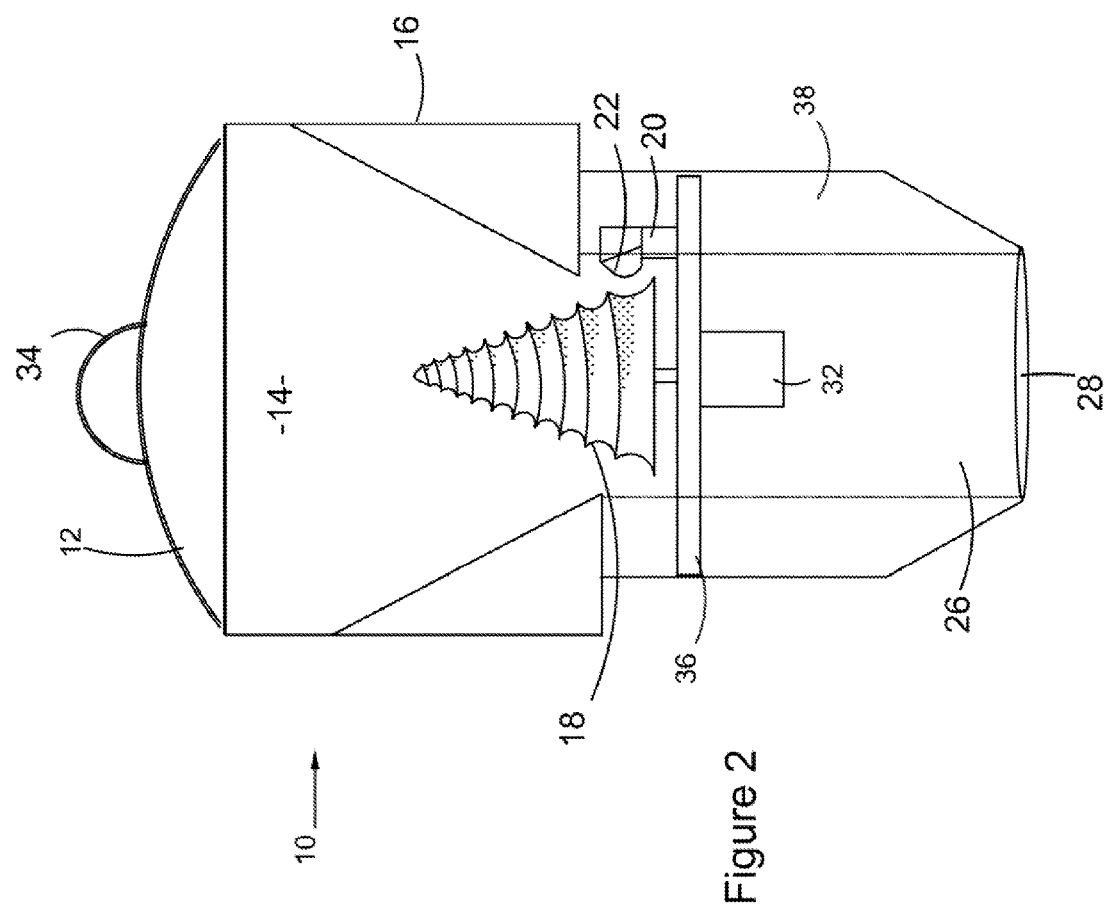
FIG. 2 is a front view of the interior of the feeder in accordance with the disclosed invention.
Figure 3:
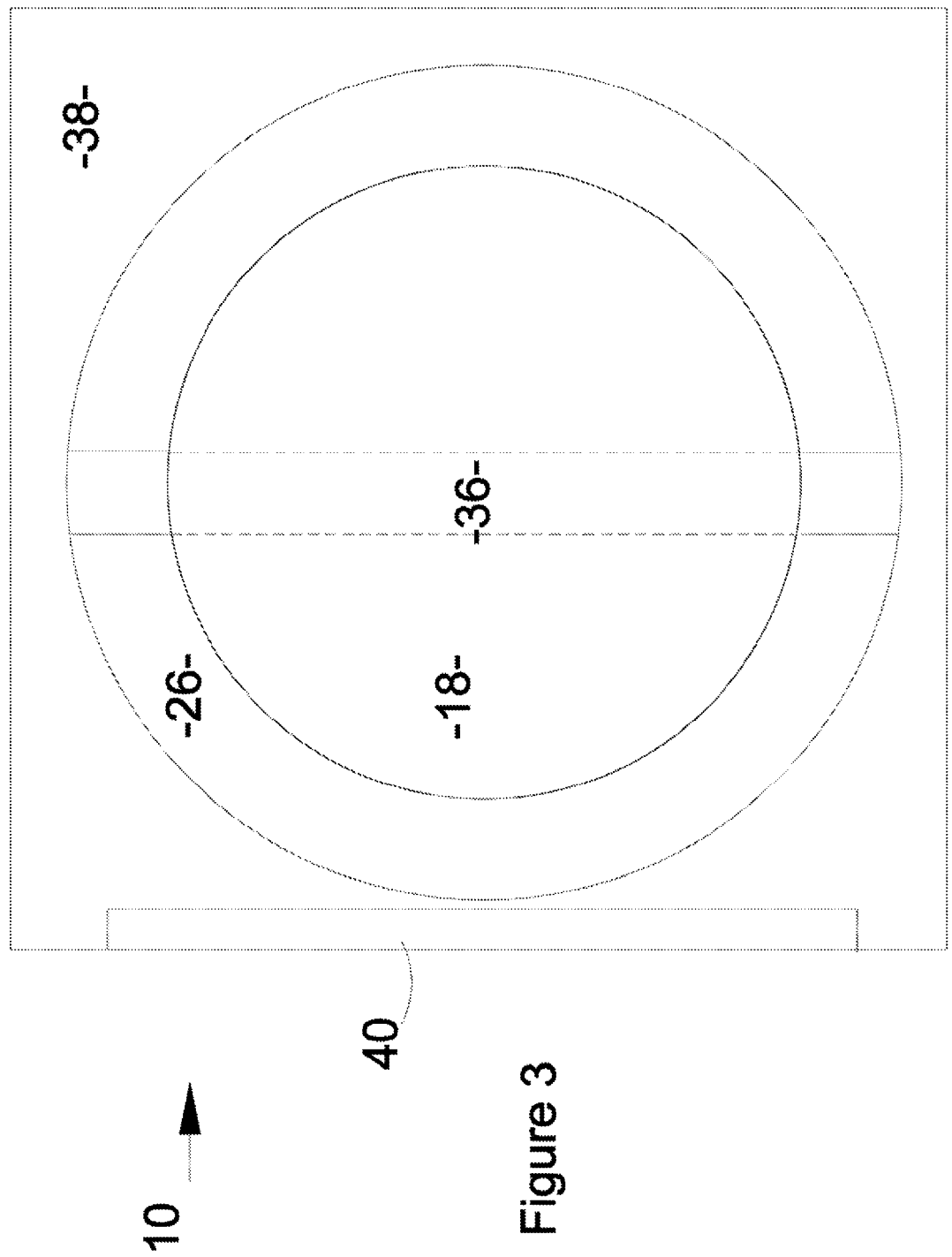
FIG. 3 is a top cutaway view of the positioning of the auger and support.

The interior of the feeder 10 is illustrated in FIG. 2 from the side and in FIG. 3 as a top cutaway, showing the placement and support 36 for the auger 18, deflection tab 22 and riser 20. The support 36 for the auger 18 extends across the opening 30 to either the wall of the dispensing tube 26 or the wall of the dispensing module 21, depending upon manufacturing preference. The support 36 can be secured to either the dispensing tube 26 or the dispensing module 21 at a predetermined height or can be made adjustable, thereby controlling the size of the feed being dispensed as described heretofore. The motor 32 is secured to the support 36 and attached to the auger 18 with a shaft. The connection between the auger 18, support 36 and motor 32 can be by any means known in the art. The control panel 40 containing the electronics can be recessed into the wall 38 of the dispensing tube 36, into the upper body 16, or can span the two. The wiring for the electronics can run along the support 36 to prevent wires from obstructing the fall of the food. In this figure a solar panel 21 is illustrated for recharging batteries 19.

The feeder 10 can be hung from an existing structure such as a deck, but is preferably attached to the disclosed animal-proof stand illustrated in FIGS. 4 and 5. The stand 300 comprises a long vertical post 302 having a hanging mechanism 304 at its distal end and a latching member 308 at its proximal end. The post 302 is connected to a ground anchor 330 at a rotation member 306 that enables the post 302 to freely rotate. In the illustrated embodiment, the post 302 is prevented from rotating beyond the vertical by the interaction of the latching member 308 with the ground anchor latch 320. A chain 322 prevents rotation beyond a predetermined position, generally 90 degrees, to enable the user to refill the food without the feeder striking the ground. Alternatively, the construction of the pivot member can only permit a predetermined degree of rotation with built in, or user adjustable, stops.

The ground anchor 330 illustrated is a U-shaped metal member sunk into the ground a sufficient distance to prevent easy removal or rocking. A cross bar 332 is connected to each leg of the ground anchor 330 and receives the locking member 320. The post pivots at the hinged point so that the upper hanging end of the post is lowered to be accessible by a person to attach and fill the feeding device. The chain, or rope, prevents the post from lowering past a preferred position, typically horizontal to the ground.

Figure 6:
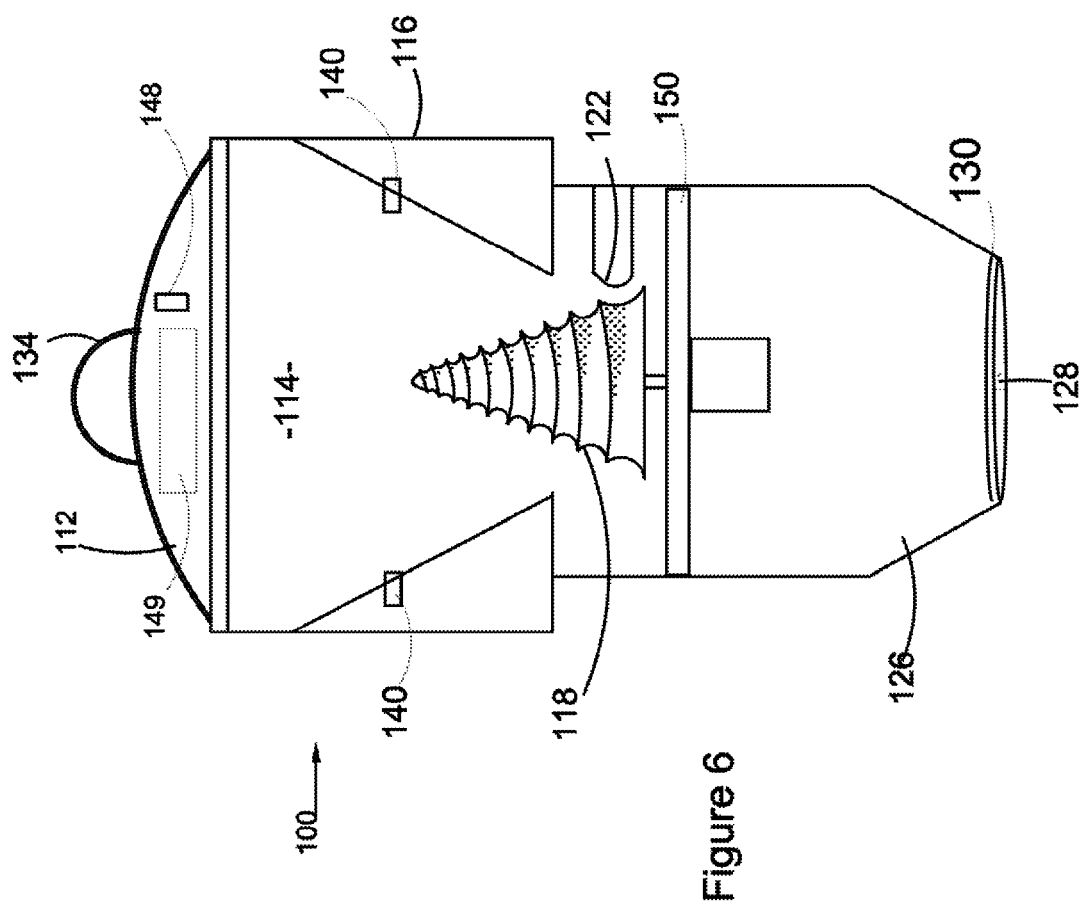
FIG. 6 is a front view of an alternate embodiment of the feeder in accordance with the disclosed invention.

An alternate embodiment is illustrated in FIG. 6 wherein the deflector 122 extends from the dispensing tube 126. The purpose and spacing from the auger 118 remain the same as described heretofore. Optic sensors 140 are used in this embodiment to indicate when the food supply decreases to a predetermined point, such as below the auger 118 tip. As an alternative to the optic sensors 140, weight sensors can be placed on the horizontal support 150 and/or a limit switch at the dispensing area 128. An electric plug receptacle 148 is illustrated in this embodiment to either charge rechargeable batteries or directly power the feeder 100. Although the location of the receptacle 148 is not critical, it must have the ability to be connected to the electronics member. Placement on the top of the feeder 100 enables the user to string an electric cord along the support post, however this is a manufacturing option and other placement can be used if included. Alternatively, the feeder 100 can be provided with solar panels 149 either instead of, or in addition to the electrical receptacle 148.

The ability to dispense cat food or bird seed using the same feeder can be obtained by moving the position of the auger with respect to the opening, as noted above. As the food is only dispensed during the rotation of the auger, the narrower the space between the opening and the auger, the smaller the food that may be dispensed. An easy, low cost method of adjusting the auger is illustrated in FIGS. 7 and 8 wherein the support 236 has flanges 238 at each end. Other methods of changing the height of the auger will be known to those skilled in the art.

A top rim 232, extending from the wall 242, provides support for the flanges 238 at a first position that would permit small feed, such as bird seed, to be dispensed. A lower rim 230, also extending from the wall 242, provides a second position that enables larger food to be dispensed. To prevent vibration, the space between the lower rim 230 and the top rim 232 and between the top rim 232 and cover 228 should be dimensioned to be slightly greater than the height of the flange 238. The top rim is provided with notches 234 that enable flanges 238 to pass between rims 232 and 230. Although two levels of adjustment are illustrated herein, this is for example only and additional layers can be provided.

An alternate embodiment is illustrated in FIG. 9 wherein the feeder 400 has the electronics and motor housing 410 separated from the auger housing 408 by multiple posts 412. In this embodiment the feed from the storage area 406 drops down, through the auger housing 408 and to the ground over the electronics and motor housing 410. A sleeve 414, made of tubing or sheet material, prevents the food from scattering. For clarity the sleeve 414 is not shown fully enclosing the electronics and motor housing 410 and the auger housing 408, the sleeve 414 would fully wrap around those elements.

It should be noted that any or all of the foregoing features can be used on any embodiment.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims (e.g., including that to be later added) are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language of the present invention or inventions should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

The invention claimed is:

1. An automated animal feeder comprising:
   a storage area, said storage area having at least one side, forming at least one interior wall and one exterior wall, a proximal end having a first opening and a distal end having a second opening,
   a dispensing module, said dispensing module having at least one side, and a dispensing tube within said dispensing module, said dispensing tube having a proximal opening adjacent to said second opening of said storage area and a distal opening,
   an auger, said auger having a length and extending from said proximal opening of said dispensing tube into said second opening of said storage area,
   an auger support, said auger connected to said auger support, said auger support extending from opposing points to span said dispensing tube, said auger support being movable along said dispensing module to vary a distance between said auger and said proximal opening of said dispensing tube,
   a motor, said motor being supported by said auger support and affixed to said auger,
   a control panel, said control panel containing a microprocessor,
   power means, said power means providing power for said control panel and said motor,
   a top, said top being removably affixed to said proximal end of said storage area and having hanging means.

2. The feeder of claim 1 further comprising a deflection tab, said deflection tab extending into said dispensing tube and being spaced a distance from said auger to prevent accumulation of food.

3. The feeder of claim 2 wherein said deflection tab is affixed to a wall of said dispensing module.

4. The feeder of claim 1 wherein aid top is dome shaped to prevent animals from gaining purchase.

5. The feeder of claim 1 wherein said control panel further comprises a display screen.

6. The feeder of claim 1 wherein said control panel further comprises programming members.

7. The feeder of claim 1 wherein said control panel i programmed by a remote control.

8. The feeder of claim 1 wherein said power means is at least one from the group of replaceable battery, rechargeable battery, solar power or electricity.

9. The feeder of claim 8 further comprising solar panels, said solar panels recharging said rechargeable battery.

10. The feeder of claim 1 further comprising multiple pairs of flanges, each pair of said multiple pairs of flanges being opposed to one another and dimensioned to receive said auger support, each pair of said multiple pairs of flanges being distanced from an adjacent pair to vary a distance between said auger and said proximal opening of said dispensing tube.

11. The feeder of claim 1 wherein said hanging means of said top is affixed to a stand, said stand having a post having a first end, a second end and a pivot point, said pivot point being affixed to said stand, said first end having a connection member for said hanging means and said second end having a rotation prevention member and an anchor, wherein said post can rotate upon release of said anchor to a predetermined distance from a ground surface determined by said rotation prevention member or be locked in an upright position by said anchor.

12. The feeder of claim 1 further comprising sensors, said sensors indicating food level within said storage area.

13. The feeder of claim 1 wherein said at least one interior wall is sloped to direct tom to said dispensing tube.

14. An automated animal feeder system comprising:
    a storage area, said storage area having at least one side forming at least an interior wall and an exterior wall, a proximal end having a first opening, a distal end having a second opening, said at least one interior wall being sloped to direct food toward said distal end,
    a dispensing module, said dispensing module having at least one side, and a dispensing tube, within said dispensing module, said dispensing tube having a proximal opening adjacent to said second opening of said storage area and a distal opening,
    an auger, said auger having a length and extending from said proximal end of said dispensing module into said second opening of said storage area,
    an auger support said auger connected to said auger support, said auger support extending from opposing points to span at least said dispensing tube said auger support being movable along said dispensing module to vary a distance between said auger and said proximal opening of said dispensing tube,
    a motor, said motor being supported by said auger support and affixed to said auger,
    a control panel, said control panel containing a microprocessor, a display screen and programming members,
    power means, said power means providing power for said control panel and said motor and being at least one from the group of replaceable battery, rechargeable battery, solar power or electricity,
    a deflection tab affixed to a wall of said dispensing module, said deflection tab extending into said dispensing tube and spaced a distance from said auger to prevent accumulation of food,
    a top, said top being removably affixed to said proximal end of said storage area and having hanging means,
    a stand, said stand having a post having a first end, a second end and a pivot point, said pivot point being affixed to said stand, said first end having a connection member for said banging means and said second end having a rotation prevention member and an anchor, wherein said post can rotate upon release of said anchor to a predetermined distance from a ground surface determined by said rotation prevention member or be locked in an upright position by said anchor.

15. A method of dispensing food using an automated food dispenser, said food dispenser having a dispensing module with a dispensing tube, an auger connected to an auger support, said dispensing tube having a proximal opening, said auger support extending from opposing points to span said dispensing tube, the method comprising the steps of:

selecting food for dispensing, removing a top from said dispenser having a food storage area with a proximal opening and a distal opening said auger having a length and extending from a proximal end of said dispensing module into said distal opening of said storage area, moving said auger support along said dispensing module to vary a distance between said auger and said proximal opening of said dispensing tube based on a size of said food for dispensing, wherein a distance between said auger and said proximal opening of said dispensing tube accommodates passage of the food upon rotation of said auger, placing said food within the storage area, programming a control panel with auger rotation time during which food is dispensed, hanging said dispenser by placing a hanging member onto an elevated hook, wherein upon rotation of said auger, food is dispensed through said distal opening of said food storage area.

16. The method of claim 15 wherein hanging said dispenser comprises the steps of:

releasing an anchor maintaining a pole in an upright position, permitting said pole to pivot on a stand, hanging said dispenser on a first end of said pole, returning said pole to said upright position, locking said anchor.

\* \* \* \* \*